(12) United States Patent
Boffa et al.

(10) Patent No.: US 11,368,514 B2
(45) Date of Patent: *Jun. 21, 2022

(54) SERVER-SIDE DETECTION AND MITIGATION OF CLIENT-SIDE CONTENT FILTERS

(71) Applicant: Akamai Technologies, Inc., Cambridge, MA (US)

(72) Inventors: Patrice Boffa, Mountain View, CA (US); Eugene Y. Zhang, San Jose, CA (US); Sabrina A. Burney, Pleasanton, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 123 days.

This patent is subject to a terminal disclaimer.

(21) Appl. No.: 17/080,437

(22) Filed: Oct. 26, 2020

(65) Prior Publication Data

US 2021/0056596 A1 Feb. 25, 2021

Related U.S. Application Data

(63) Continuation of application No. 15/293,767, filed on Oct. 14, 2016, now Pat. No. 10,817,913.

(Continued)

(51) Int. Cl.

| | | |
|---|---|---|
| *G06F 15/173* | (2006.01) | |
| *H04L 67/025* | (2022.01) | |
| *H04L 61/301* | (2022.01) | |
| *H04L 9/40* | (2022.01) | |
| *G06F 16/95* | (2019.01) | |
| *H04L 61/2539* | (2022.01) | |
| *H04L 67/146* | (2022.01) | |
| *G06F 15/16* | (2006.01) | |
| *H04L 101/30* | (2022.01) | |
| *G06Q 30/02* | (2012.01) | |

(52) U.S. Cl.
CPC ............ *H04L 67/025* (2013.01); *G06F 16/95* (2019.01); *H04L 61/2539* (2013.01); *H04L 61/301* (2013.01); *H04L 63/029* (2013.01); *H04L 67/146* (2013.01); *G06Q 30/0277* (2013.01); *H04L 2101/30* (2022.05)

(58) Field of Classification Search
CPC . H04L 67/025; H04L 61/2539; H04L 61/301; H04L 61/303; H04L 63/029; H04L 67/146; G06F 16/95; G06Q 30/0277
USPC ........................................................ 709/217
See application file for complete search history.

(56) References Cited

U.S. PATENT DOCUMENTS

| | | | | |
|---|---|---|---|---|
| 9,338,143 B2 * | 5/2016 | Hansen | ................. | G06F 16/958 |
| 11,196,712 B1 * | 12/2021 | Norbutas | ................ | H04L 43/10 |

(Continued)

*Primary Examiner* — Karen C Tang
(74) *Attorney, Agent, or Firm* — David H. Judson

(57) ABSTRACT

A server-side technique to detect and mitigate client-side content filtering, such as ad blocking. In operation, the technique operates on a server-side of a client-server communication path to provide real-time detect the existence of a client filter (e.g., an ad blocker plug-in) through transparent request exchanges, and then to mitigate (defeat) that filter through one or operations designed to modify the HTML response body or otherwise obscure URLs. Preferably, the publisher (the CDN customer) defines one or more criteria of the page resources being served by the overlay (CDN) and that need to be protected against the client-side filtering.

18 Claims, 8 Drawing Sheets

Related U.S. Application Data

(60) Provisional application No. 62/336,901, filed on May 16, 2016, provisional application No. 62/242,417, filed on Oct. 16, 2015.

(56) References Cited

U.S. PATENT DOCUMENTS

| | | | |
|---|---|---|---|
| 11,270,070 B1* | 3/2022 | Douglas | G06F 40/106 |
| 2012/0022942 A1* | 1/2012 | Holloway | G06F 40/143 |
| | | | 705/14.49 |
| 2021/0224866 A1* | 7/2021 | Doumar | H04L 67/306 |
| 2021/0287256 A1* | 9/2021 | Smith | G06Q 30/0277 |
| 2022/0020066 A1* | 1/2022 | Robinson | G06Q 30/0277 |
| 2022/0067791 A1* | 3/2022 | Martin | G06Q 30/0264 |
| 2022/0084143 A1* | 3/2022 | Byer | G06Q 30/0277 |

* cited by examiner

```
<html>
    <head>
        <title>Client Filter Detection</title>
        <meta content="text/html; charset=utf-8" http-equiv="Content-Type"/>
    </head>
    <body>

<script type="text/javascript" language="JavaScript">
        var blockStatus=true;
    </script>
    <script type="text/javascript" src="/detector/ad.js"></script>
    <script type="text/javascript" language="JavaScript">
        setCookie (blockStatus) ;
        function setCookie (blockStatus) {
            var tExpDate=new Date ( ) ;
            var pMinutes = 6;
            var domain = document.domain;
            tExpDate.setTime (tExpDate.getTime ( ) + (pMinutes*60*1000) );
            var c_value= blockStatus"" . "; expires="+ tExpDate.toGMTString ( ) )
+ "; path=/" + ";domain=."+ domain;
            document.cookie= "akblock" + "=" + c_value;
            reload_page ( ) ;
        } function reload_page ( ) {
            location.reload (true) ;
        }
    </script>
    </body>
</html>
```

```
importScripts;
var policy = " ";
var policy_arry = " ";
self.addEventListener('install', function(event) {
  self.skipWaiting();
  var policyRequest = new Request('thirdparty_urls_rewrite.txt');
  fetch(policyRequest).then(function(response) {
    return response.text().then(function(text) {
      policy=text.toString();
      policy_arry = policy.split("\n");
    });
  });
});
self.addEventListener('activate', function(event) {
  if (self.clients && clients.claim) {
    clients.claim();
  }
});
self.addEventListener('fetch', function(event) {
  event.respondWith(
    fetch(event.request.url).then(function(response) {
            if(/javascript|html|text|css/.test(response.clone().headers.get('Content-Type'))==false){
              return response.clone();
            }
            else {
              return (response.clone()).text().then(
                function(text) {
                    var response_string = text.toString();
                    var key = CryptoJS.enc.Hex.parse('');
                    var iv = CryptoJS.enc.Hex.parse('');

for (var i =0; i < policy_arry.length; i++) {
                       if(policy_arry[i]){
                          var regexHostname = new RegExp(policy_arry[i], 'i');
                          if(regexHostname.test(response_string)){
                             var num = Math.random().toString(36).substring(2,10);
                             var encrypted = CryptoJS.TripleDES.encrypt(num+policy_arry[i], key, { iv: iv, mode: CryptoJS.mode.CBC});

var rewrite_url = 'sw.project.com/' + encrypted;
                             response_string = response_string.replace(new RegExp(policy_arry[i],'gi'), rewrite_url);
                          }
                       }
                    }
                    return new Response(response_string,{status: response.clone().status,statusText:response.clone().statusText, headers: response.clone().headers});
                }
              );
            }
    })
  );
});
```

SERVER-SIDE DETECTION AND MITIGATION OF CLIENT-SIDE CONTENT FILTERS

BACKGROUND

Technical Field

This application relates generally to overlay networking and, in particular, to server-based methods to detect and mitigate the effects of client-side advertisement blocking (ad blocker) technologies.

Brief Description of the Related Art

Distributed computer systems are well-known in the prior art. One such distributed computer system is a "content delivery network" or "CDN" that is operated and managed by a service provider. The service provider typically provides the content delivery service on behalf of third parties (customers) who use the service provider's infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer. For typical web-based content delivery, end user client machines (e.g., laptops, mobile devices, etc.) running web browsers or web apps interact with CDN server (so-called "edge") machines using standard web protocols, such as HTTP and HTTPS.

Advertising on web pages is ubiquitous. Many end users, however, do not wish to view ads on web pages that they download from web sites. In response, advertisement blocking technologies have been developed and implemented across many web sites. The actual ad blocking, however, occurs on the client-side of the client-server communication, typically as the web page is being rendered on the client machine. Indeed, with hundreds of millions of installations, client filtering plug-ins such as "Adblocker" are among the most popular browser extensions on the Internet. These technologies typically operate by blacklisting URLs that are known to call out to ad server domains.

Ad blocking technology, however, provides a blunt or coarse-level approach that not only blocks a variety of advertisements from being rendered on the end user client machine, but it may also interfere, unintentionally or not, with other client-side technologies and functions. Thus, for example, a client filtering plug-in of this type also blocks tracking and social media share buttons (including beacons used for data analytics), thereby making data collection from the client difficult. This can inhibit the site's ability to run successful marketing campaigns that offer rely on such data collection. Of course, ad blocking technologies severely impact sites which rely on the ads for their revenue source, and they have an indirect effect on advertisers whose ad content never makes it to the end users.

Techniques to circumvent ad blocking technologies also are known. One well-known approach involves encrypting or scrambling the URLs so that URL blacklisting does not work. More sophisticated approaches to secure the display of advertisements on web clients involve modifying web pages (e.g., by converting ad images to video) before they are delivered to the client. These approaches provide some advantages, but more robust solutions are required, especially in the context of an overlay network-based implementation.

BRIEF SUMMARY

This disclosure describes a server-side technique to detect and mitigate client-side content filtering, such as ad blocking. In operation, the technique operates on a server-side of a client-server communication path to provide real-time detection of the existence of a client filter (e.g., an ad blocker plug-in) through transparent request exchanges, and then to mitigate (defeat) that filter through one or operations designed to modify the HTML response body or otherwise obscure URLs. Preferably, the publisher (the CDN customer) defines one or more criteria of the page resources being served by the overlay (CDN) and that need to be protected against the client-side filtering.

In an alternative embodiment, the above-described technique is used in the context of a browser that supports service workers.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 5 is a representative HTML code snippet for a challenge script used for ad blocker detection;

FIG. 8. depicts a code snippet of a service-worker script that may be used in the alternative embodiment.

DETAILED DESCRIPTION

Figure 1:
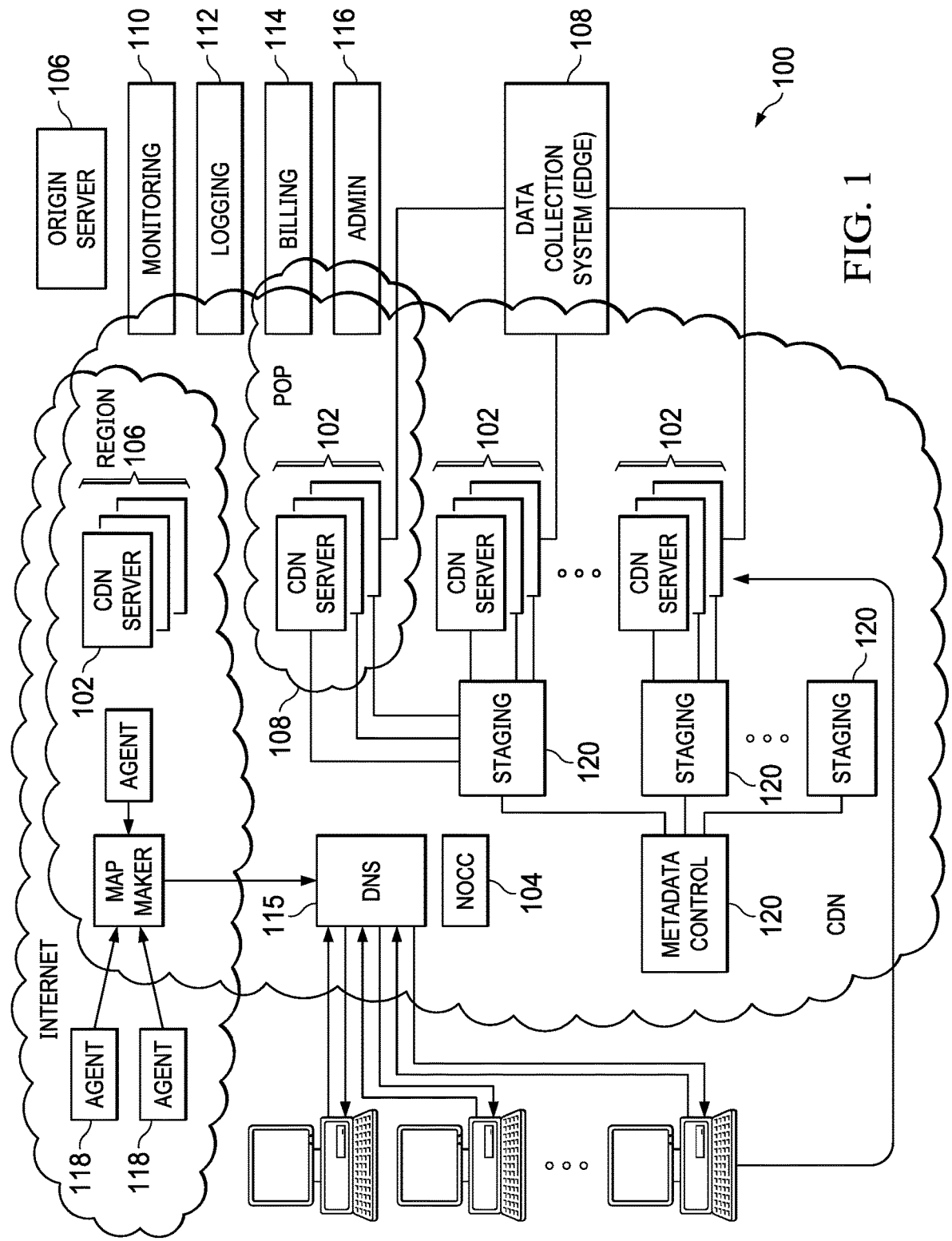
FIG. 1 is a block diagram illustrating a known distributed computer system configured as a content delivery network (CDN)

In a known overlay network system, such as shown in FIG. 1, a distributed computer system 100 is configured as a CDN and is assumed to have a set of machines 102*a-n* distributed around the Internet. Typically, most of the machines are servers located near the edge of the Internet, i.e., at or adjacent end user access networks. A network operations command center (NOCC) 104 manages operations of the various machines in the system. Third party sites, such as website 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or subdomains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
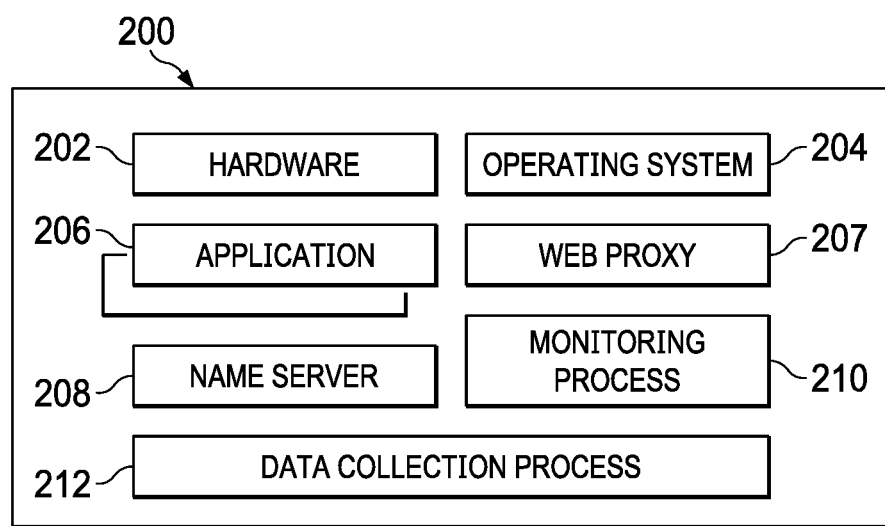
FIG. 2 is a representative CDN edge machine configuration.

As illustrated in FIG. 2, a given machine 200 comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" process), a name server 208, a local monitoring process 210, a distributed data collection process 212, and the like. More generally, ghost is software, comprising program instructions, which instructions are held in memory and executed by a processor as needed. For streaming media (that is not HTTP-based), the machine may include one or more media servers, such as a Windows Media Server (WMS) or Flash server, as required by the supported media formats.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

Because the CDN infrastructure is shared by multiple third parties, it is sometimes referred to herein as a multi-tenant shared infrastructure. The CDN processes may be located at nodes that are publicly-routable on the Internet, within or adjacent nodes that are located in mobile networks, in or adjacent enterprise-based private networks, or in any combination thereof.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

As an overlay, the CDN resources may be used to facilitate wide area network (WAN) acceleration services between enterprise data centers (which may be privately-managed) and third party software-as-a-service (SaaS) providers.

Server-Side Detection and Mitigation of Client-Side Content Filters

With the above as background, the technique of this disclosure is now described.

Figure 3:
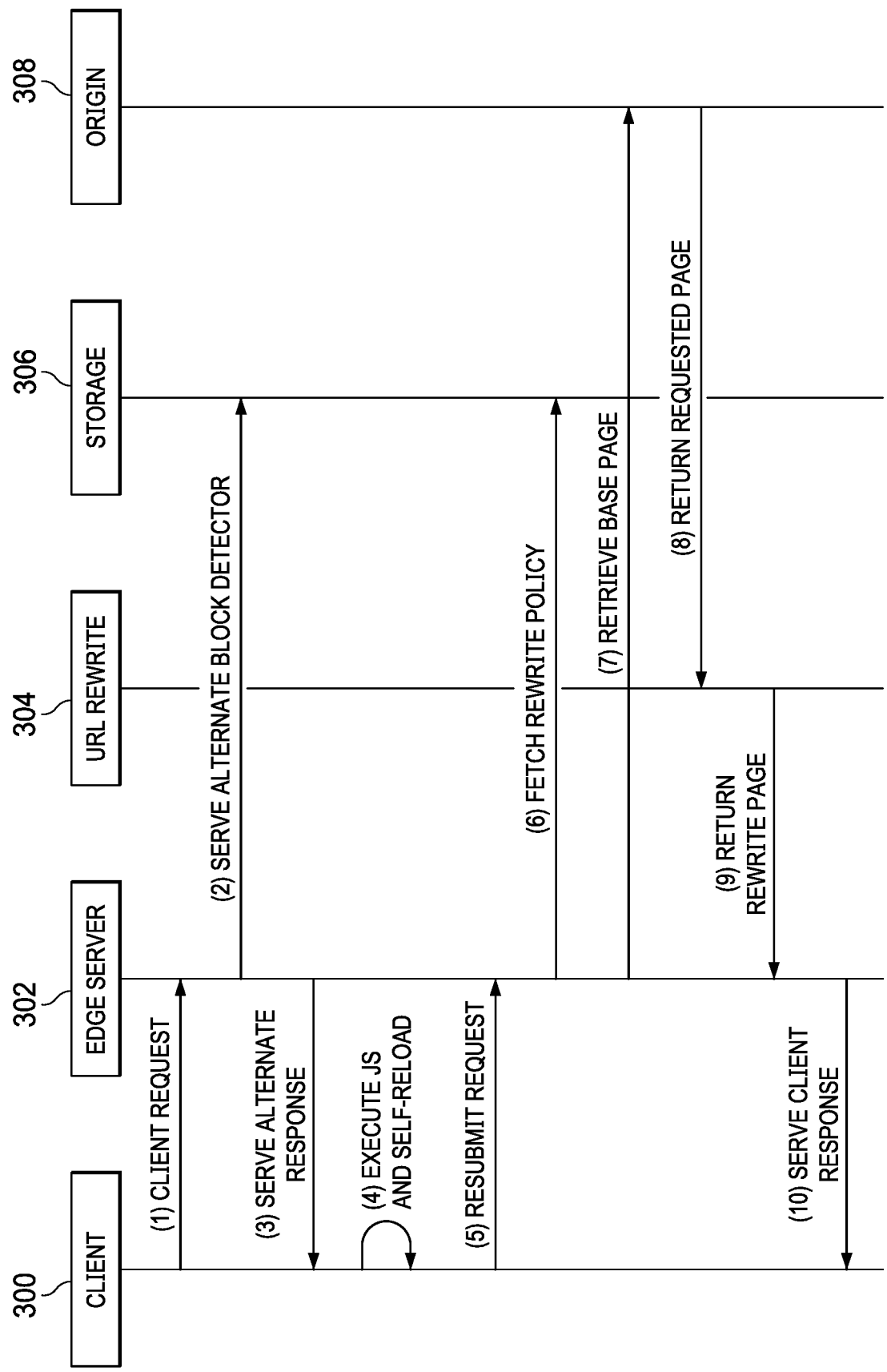
FIG. 3 is a representative client filter bypass sequence that is implemented according to this disclosure.

As depicted in FIG. 3, a "client filter bypass" sequence of operation is enabled from the server-side of a typical end user client machine-CDN edge server interaction. This operation assumes that an end user is requesting a web resource (such as a page) and has been directed to the CDN edge machine to fetch it. The client machine includes some client-side content filter mechanism, such as an ad blocking plug-in running in a web browser. The particular nature and functionality of the client-side content filter or mechanism is not an aspect of the subject disclosure, as the subject technique is designed to be implemented from the "server-side" of the interaction and irrespective of the client filter. A CDN customer that desires to implement the feature for its web pages being served by the CDN may identify the particular pages (or page resources) that are to be protected against the client filters (i.e., protected against being filtered) by accessing a secure web portal provided by the CDN and identifying particular pages or resources. The resulting "configuration" for the server-side detection and mitigation can then be provided to the CDN edge server(s) and implemented in the following manner.

As seen in FIG. 3, a client 300 represents the end user client machine (e.g., a web browser running an ad blocker) that would otherwise be operative to block certain content that the origin 308 desires to be viewed by the end user. That content typically is advertising content (e.g., banner ads, interstitials, etc.) and is typically sourced from a third party domain (as opposed to the origin 308, which typically is the source of the page that otherwise "includes" the advertising content upon rendering at the client. The origin 308 typically is associated with a CDN customer, who otherwise desires the CDN to deliver origin-sourced content. The CDN operates the CDN (see, e.g., FIG. 1) that includes the edge server 302 (such as the machine shown in FIG. 2). The edge server 302 includes a URL rewrite function or process 304. In this example scenario, the CDN also include other storage 306 that can be used to receive and store content, URL rewrite policies, customer- or system-specified configurations, and other data used by the CDN to support this functionality.

As depicted in FIG. 3, the basic operation begins at step (1) when the client 300 makes a request for a page that is received at the edge server 302. If the request does not have given information (e.g., a cookie indicating that ad blocking is enabled) associated therewith, the edge server 302 continues at step (2) by querying the storage 306 for a policy or configuration, which is then returned in response to the query. The policy or configuration typically comprises a list of third party ad domains (as specified by the customer) that must bypass client-side filtering that would otherwise filter such content. Based on the policy or configuration returned, the edge server 302 then continues at step (3) to serve an alternate response to the original request. The alternative response preferably includes a challenge script that is used to determine whether the serve a challenge script for ad blocker detection. At step (4), the client 300 executes the script (to detect the ad blocker). As will be described in more detail below, execution of the script "sets" the ad blocker present cookie and causes a re-load operation. This re-load causes the client to re-submit the original request back to the edge server at step (5), together with the cookie that has now been set by virtue of the script execution. In other words, the original request differs from the re-submitted request by the inclusion of the "ad blocker present" cookie. The edge server 302, having received the re-submitted request (with the cookie being set), then continues at step (6) to retrieve a rewrite policy from the storage 306. At step (7), the edge server 302 retrieves the base page from the origin 308, which returns that base page back to the edge machine at step (8). The base page is passed to the edge machine URL rewrite mechanism 304, which rewrites the URLs as necessary (according to the configuration and rewrite policy) and, at step (9), returns to the edge server the rewritten page. At step (10), the edge server 302 serves the rewritten page back to the requesting client 300. This completes the processing.

Steps (2) and (6) may be avoided if the edge server caches the ad blocking detection script, the rewrite policy, and any other information that might otherwise be stored in the storage 306. Thus, the use of the storage 306 is optional.

Figure 4:
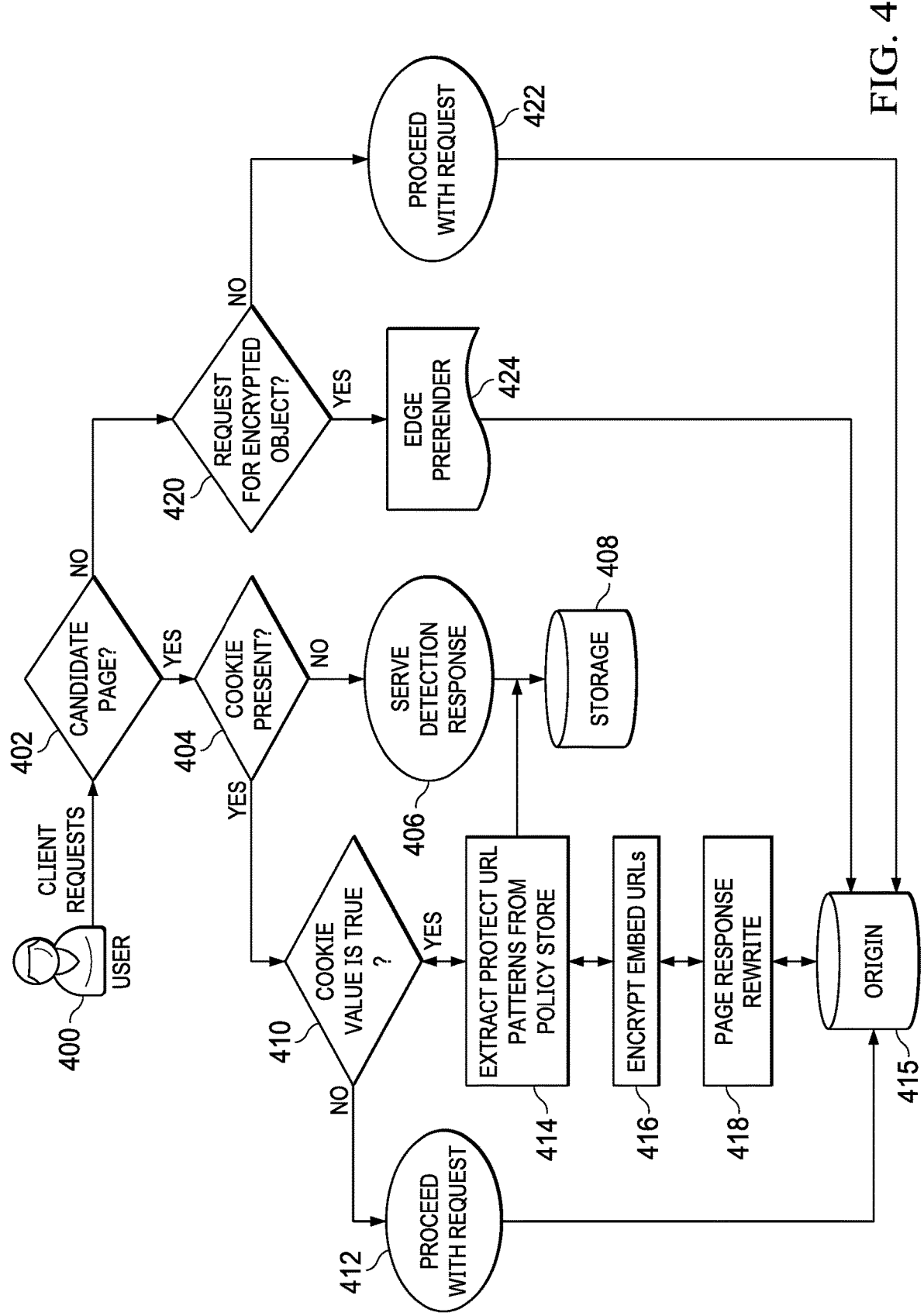
FIG. 4 illustrates a process flow for the client filter bypass operation.

FIG. 4 describes a first preferred process flow for the above-described server-side ad blocking detect and mitigate operation. The original client request (which as noted above may or may not include a cookie that is set by the edge server and that identifies the existence of the ad blocker) is generated by the client machine, typically when an end user 400 operating that machine makes a request. At step 402, a test is performed to determine whether the page request is a candidate for ad blocking detection and mitigation. If so, the routine continues at step 404 to determine whether the request already has the ad blocker present cookie associated therewith indicating that the client machine implements ad blocking. If not, the routine continues at step 406 with the edge server implementing the alternate response operation. To this end, the edge server interacts with the storage 408 to fetch the configuration and serve the detection script, as has been described. In other words, steps 404 and 406 implement an ad blocker detect function. Although not depicted, but as described above, the client executes the script, which sets the ad blocker cookie and causes the request to be re-submitted; thus, control returns back to step 402. Thus, the client re-load initiates the "mitigation" operation. In this iteration, however, the outcome of the test at step 404 is positive (because the cookie is now present, where it was not during the initial iteration). At this point then, control branches to step 410 to facilitate mitigation of the client-side content filtering.

To that end, at step 410 a test is performed to determine whether the cookie value is true. If not, control branches to step 412 and the request is processed without mitigation. This may or may not involve an interaction with the origin 415 as depicted. If, however, the outcome of the test at step 410 indicates that the ad blocker present cookie is true, control then branches to step 414, wherein the edge server interacts with the storage 408 (e.g., step (6) in FIG. 3) and extracts one or more protected URL patterns from the rewrite policy retrieved. As noted above, preferably the CDN customer (the publisher) specifies the rewrite policy, although a system-supplied default policy may be implemented. Based on the configuration or policy, one or more URLs are encrypted at step 416, and the page response is rewritten. This is step 418, and it is typically performed by the URL rewrite function that is supported in association with the edge server. As noted above, the base page is retrieved (e.g., step (7) in FIG. 3) from the origin 415 as needed to facilitate the rewrite function. The page as modified (according to the configuration or policy) is then returned to the client to complete the mitigation function.

The nature of the rewrite may vary, although typically ad URL calls are encrypted. The rewrite policy preferably initializes one or more variables identifying third party domains that must bypass ad blocking. When those domains are encountered by the URL rewrite function, an ad hostname therein (which might otherwise be blocked by the client filter) are replaced, e.g., with a first party hostname on the CDN.

From the client-side perspective, the mitigation is seamless because of the page modifications that defeat the client filter. When the client receives and parses the rewritten page, it encounters and requests (typically once again from the CDN) the encrypted ad URL calls. Referring back to FIG. 4, at this iteration test 420 is performed to determine whether this is a request for an object that has been processed through the mitigation operation. If not, the routine branches to step 422 and serves the requested resource in the usual manner. If, however, the outcome of the test at step 420 is positive, the routine branches to step 424. In one embodiment, step 424 implements an edge pre-render service. The pre-render service decrypts the URL and forwards the request to fetch content (typically from a third party provider such as an ad server), preferably based on decrypted ad path components. The edge pre-render service receives the response and pre-renders the content if needed (e.g., because the resources in the response contain JavaScript or additional resources). Once the rendering is completed, the edge pre-render service serves the constructed response back to the client. Optionally, the edge server caches (for re-use) the output of the pre-render.

Rendering a base page in this manner (before serving to the client) eliminates the need for client-side JavaScript execution.

The following represents a detailed implementation of the above-described server-side detect and mitigation functionality. In this example scenario, which is not intended to be limiting, a representative challenge script (/akachallenge.html) is shown in FIG. 5 (© 2015, Akamai Technologies, Inc.). An example code snippet for ad.js is var blockStatus=false.

Detection

Client:
Requests the URL http://www.customer.com/; no ad blocker cookie in the request.

Edge Server:
Upon receipt of the request, issue a fail action to serve a challenge script (e.g., /akachallenge.html) for ad blocker detection Client:
  Execute the HTML code of the detection script
  a. Initialize variable $blockStatus=true
  b. Attempt to Load external external Javascript file ads.js if successful
    set variable $blockStatus=false
  c. set client cookie AKABLOCK with value $blockStatus
  d. perform html self-reload Mitigation (Client Reload Request)

If the cookie is present
If AKABLOCK=NO
  Process request/response without modification
If AKABLOCK=YES
  Encrypt ad URL calls in base page and embedded resources
  Initialize variable % (THIRDPARTY_DOMAINS) with domains that must bypass ad blocking
    Retrieve policy from policy store
    Example: (ad.dclick.net/pagead2.gsyndication.com/cdn.net/)
  Inspect HTML RESPONSE_BODY for domains listed in % (THIRDPARTY_DOMAINS)
    Recursive—For every ad object URL in the RESPONSE_BODY and embedded resources:
    Initialize variables based on full ad object URL: % (AD_HOST), % (AD_URL)
    Encrypt % (AD_HOST) % (AD_URL) using encryption algorithm and designated KEY value: % (ENCRYPT_URL)
    Apply URL encoding to % (ENCRYPT_URL)
    Apply edge server rewrite function
      Replace ad hostname with first party hostname on CDN
      Replace the ad URL with the encrypted URL % (ENCRYPT_URL)

Mitigation (Encrypted Ad Resource Requests)

Incoming request for ad resource:
  Extract encrypted URL, decrypt using 3DES algorithm and designated KEY: % (DECRYPT_URL)
  Apply URL decoding to % (DECRYPT_URL)
  Extract ad hostname % (DECRYPTED_HOST) and ad URL % (DECRYPTED_URL) from % (DECRYPT_URL)
  Forward the request to pre-render service
  Pre-render service forwards request to fetch content (from third party provider) based on decrypted ad path components Thus, according to the above-described technique, and in this first embodiment, when the edge server receives the request, it checks for the presence of a cookie indicating that ad blocking content filters are present. If the cookie is not present, a fail action is initiated and a small piece of code (e.g., HTML that contains Javascript) is served. When the HTML is interpreted by the browser or other renderer on the client, the Javascript is executed. The script sets a value (true) to a variable. If ad blocking on the client is installed, a remote call to reset the variable value will be blocked, and therefore the value will set to true. The script sets the value to a client cookie (e.g., named BLOCK-PRESENCE), and performs a page self-refresh. If the client is present, there are then two scenarios. If the cookie BLOCK-PRESENCE is NO, the server processes the request as is. If the cookie BLOCK-PRESENCE is YES, however, the rewrite policy is fetched and instantiated (e.g., by encrypted ad URL calls). Thus, the preferred approach thus implements both page rewriting and URL encryption (or other obfuscation). Where API calls have recursive Javascript inclusions, preferably the scripts are in-lined into the base page so that inner-embed ad images also get processed (rewritten in encrypted form). An alternative is to send the ad call to the pre-render engine to perform ad call rendering and serve back a fully-rendered ad image.

Service Worker Embodiment

The following provides an alternative embodiment wherein the browser supports service worker threads. A service worker is an event-driven worker registered against an origin and a path. Typically, a service worker is in the form of a JavaScript file that can control the web page with which it is associated. A service worker is sometimes referred to as a web worker. Generalizing, a web worker, as defined by the World Wide Web Consortium and the Web Hypertext Application Technology Working Group, is a JavaScript script executed from an HTML page that runs in the background, independently of other user-interface scripts that may also have been executed from the same HTML page. A service worker is an event-driven worker registered against an origin and a path. It takes the form of a JavaScript file that can control the page with which it is associated. It runs in its own thread, and is non-blocking.

Figure 6:
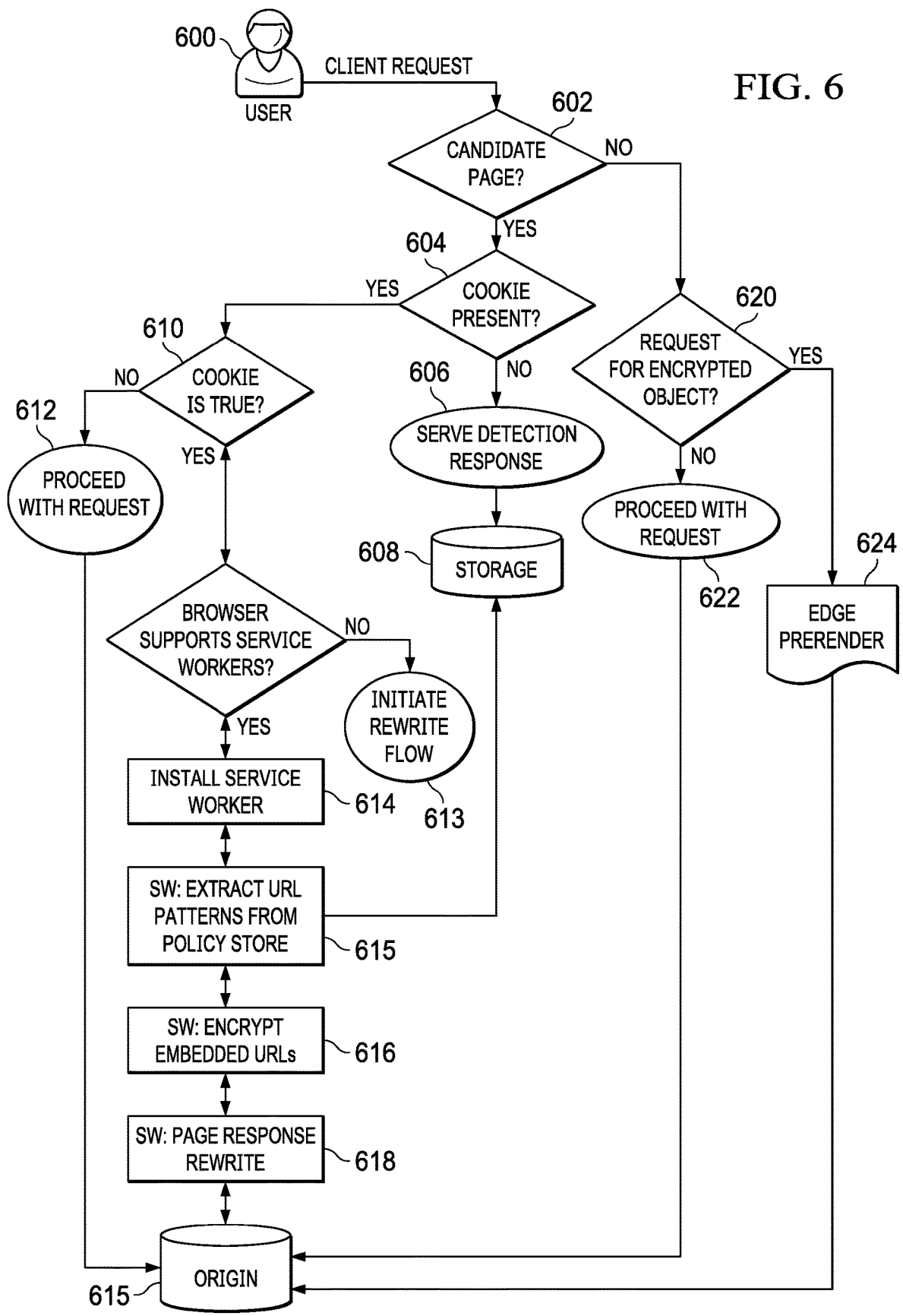
FIG. 6 is an alternative embodiment of the client filter detection and mitigation flow when the browser supports service workers.
Figure 7:
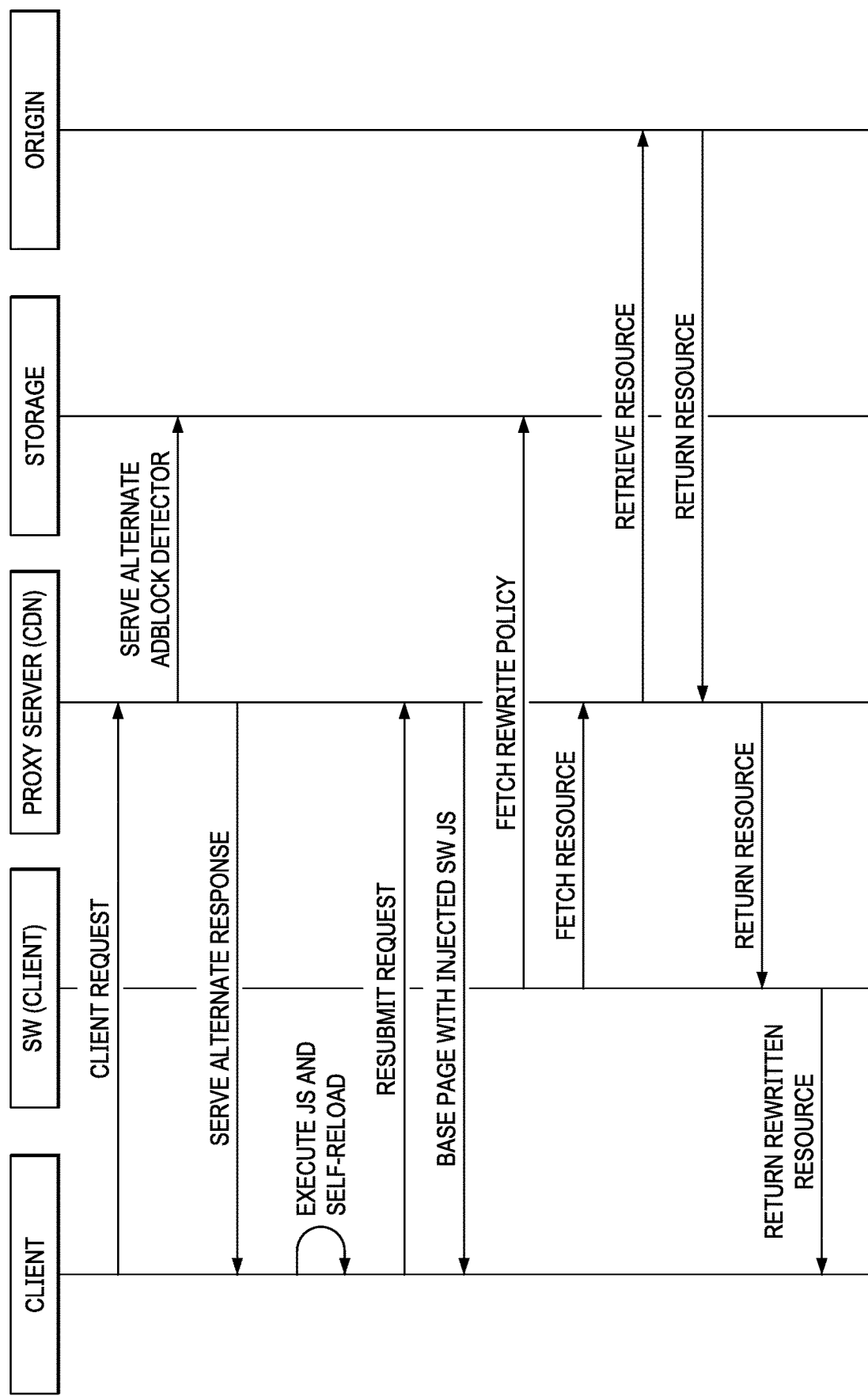
FIG. 7 details the client filter bypass sequence for the service worker embodiment.

Referring now to FIG. 6, the depicted operations are similar to those described above with the addition of operations to detect browser support for service workers, and the installation of a service worker (SW) to provide the follow-on operations as shown.

In particular, FIG. 6 describes a second preferred process flow for the above-described server-side ad blocking detect and mitigate operation when the browser supports service workers. The original client request (which as noted above may or may not include a cookie that is set by the edge server and that identifies the existence of the ad blocker) is generated by the client machine, typically when an end user 600 operating that machine makes a request. At step 602, a test is performed to determine whether the page request is a candidate for ad blocking detection and mitigation. If so, the routine continues at step 604 to determine whether the request already has the ad blocker present cookie associated therewith indicating that the client machine implements ad blocking. If not, the routine continues at step 606 with the edge server implementing the alternate response operation. To this end, the edge server interacts with the storage 608 to fetch the configuration and serve the detection script, as has been described. As noted above, steps 604 and 606 implement an ad blocker detect function. Although not depicted, but as described above, the client executes the script, which sets the ad blocker cookie and causes the request to be re-submitted; thus, control returns back to step 602. As also previously noted, the client re-load initiates the "mitigation" operation. In this iteration, however, the outcome of the test at step 604 is positive (because the cookie is now present, where it was not during the initial iteration). At this point then, control branches to step 610 to facilitate mitigation of the client-side content filtering.

To that end, at step 610 a test is performed to determine whether the cookie value is true. If not, control branches to step 612 and the request is processed without mitigation. This may or may not involve an interaction with the origin 615 as depicted. If, however, the outcome of the test at step 610 indicates that the ad blocker present cookie is true, control then branches to step 611 to test whether the browser supports service workers. If not, the routine branches to step 613, which represents the rewrite processing flow described above in FIG. 4 (namely, operations 414, 416 and 418). If, however, the browser supports service workers, the routine continues at step 614 to install a service worker (SW), which then takes over the processing for this portion of the process flow going forward.

To that end, at step 615 the service worker interacts with the storage 608 (e.g., step (6) in FIG. 3) and extracts one or more protected URL patterns from the rewrite policy retrieved. As noted above, preferably the CDN customer (the publisher) specifies the rewrite policy, although a system-supplied default policy may be implemented. Based on the configuration or policy, one or more URLs are encrypted by the service worker at step 616, and the page response is rewritten by the service worker. This is step 618, and it is typically performed by the URL rewrite function that is supported in association with the edge server. As noted above, the base page is retrieved (e.g., step (7) in FIG. 3) from the origin 615 as needed to facilitate the rewrite function. The page as modified (according to the configuration or policy) is then returned to the client to complete the mitigation function.

As noted in the previous embodiment, the nature of the rewrite may vary, although typically ad URL calls are encrypted. The rewrite policy preferably initializes one or more variables identifying third party domains that must bypass ad blocking. When those domains are encountered by the URL rewrite function, an ad hostname therein (which might otherwise be blocked by the client filter) are replaced, e.g., with a first party hostname on the CDN.

From the client-side perspective, the mitigation is seamless because of the page modifications that defeat the client filter. When the client receives and parses the rewritten page, it encounters and requests (typically once again from the CDN) the encrypted ad URL calls. Referring back to FIG. 6, at this iteration test 620 is performed to determine whether this is a request for an object that has been processed through the mitigation operation. If not, the routine branches to step 622 and serves the requested resource in the usual manner. If, however, the outcome of the test at step 620 is positive, the routine branches to step 624. In one embodiment, step 624 implements an edge pre-render service. The pre-render service decrypts the URL and forwards the request to fetch content (typically from a third party provider such as an ad server), preferably based on decrypted ad path components. The edge pre-render service receives the response and pre-renders the content if needed (e.g., because the resources in the response contain JavaScript or additional resources). Once the rendering is completed, the edge pre-render service serves the constructed response back to the client. Optionally, the edge server caches (for re-use) the output of the pre-render.

The following provides a detailed implementation of the above-described server-side detect and mitigation functionality in the alternative service worker embodiment.

Detection

Client:
  Requests the URL http://www.customer.com/, no ad blocker cookie in the request.
Edge:
  Upon receipt of the request, issue a fail action to serve a challenge script (e.g. /akachallenge.html) for ad blocker detection
Client:
  Execute the HTML code of the detection script
  a. Initialize variable $blockStatus=true
  b. Attempt to Load external external Javascript file ads.js
  if successful
    set variable $blockStatus=false
  c. set client cookie AKABLOCK with value $blockStatus
  d. perform html self-reload Mitigation (Client Reload Request)

If the cookie is present
If AKABLOCK=NO
  Process request/response without modification
If AKABLOCK=YES
  Serve base page and inject JavaScript at the Edge to initiate Service Worker logic on the client
  If browser supports Service Workers, initiate service-worker.js:
    Fetch policy list of $3^{rd}$ party signatures that need to bypass adblocker
    Recursive—For every ad object in the RESPONSE_BODY that matched the policy list:
      Generate encrypted signatures using 3DES algorithm
      Rewrite response body:
        Replace ad hostnames with first party hostname on Akamai
        Replace the ad URLs with the encrypted URL % (ENCRYPT_URL)

Mitigation (Encrypted Ad Resource Requests)

Incoming request for ad resource:
  Extract encrypted URL, decrypt using 3DES algorithm and designated KEY: % (DECRYPT_URL)
  Apply URL decoding to % (DECRYPT_URL)
  Extract ad hostname % (DECRYPTED_HOST) and ad URL % (DECRYPTED_URL) from % (DECRYPT_URL)
  Forward the request to pre-render service
  Pre-render service forwards request to fetch content (from $3^{rd}$ party provider) based on decrypted ad path components The code snippet below (© 2016, Akamai Technologies, Inc.) shows an example of Service Worker installation code injected into base page:

```
<script>
if ('serviceWorker' in navigator) {navigator.serviceWorker.register('./service-
worker.js').then(function(registration) {console.log('ServiceWorker registration successful with scope: ',
registration.scope);}).catch(function(err) {console.log('ServiceWorker registration failed: ', err);});}
</script>
```

FIG. 8 depicts a code snippet (© 2016, Akamai Technologies, Inc.) of an example script for the service-worker.js.

The described approach has many advantages including circumvention of client-side ad blocking using server-side detection and mitigation. The solution empowers content/ad publishers to maintain desired application functionalities and prevents revenue loses otherwise attributable to advertisement or content blocking. The approach may be readily implemented in a cost-effective and highly-scalable manner by augmenting existing CDN caching and URL rewrite functions, and with no additional hardware setup. No changes to the client are needed.

The client is a conventional desktop, laptop or Internet-accessible or wired network-accessible machine or device running a web browser, a mobile app, or rendering engine or another type or form. Typically, the client supports service workers, although this is not a requirement. The client may be a mobile device, an IOT appliance or device, or otherwise.

More generally, the server-side techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The server-side functionality may be provided as a service, e.g., as a SaaS solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

Preferably, the functionality is implemented in an application layer solution, although this is not a limitation, as portions of the identified functions may be built into an operating system or the like.

The functionality may be implemented with any application layer protocol.

There is no limitation on the type of computing entity that may implement the client-side or server-side. Any computing entity (system, machine, device, program, process, utility, or the like) may act as the client or the server.

The type of content being filtered is not limited to advertisements. The approach works for any type of content that would otherwise be filtered at the client-side for whatever reason. In addition to the advantages described above, the techniques herein generally provide for the above-described improvements to a technology or technical field (namely, overlay networking, content delivery, and the like), as well as the specific technological improvements to ad serving technologies, all as described above.

What is claimed is as follows:

The invention claimed is:

1. Apparatus associated with a server side of a client-server communication, comprising:
   a processor;
   computer memory storing computer program instructions executed by the processor, the computer program instructions comprising:
      first program code responsive to receipt of a request for a resource from a client (i) to determine whether the request has associated therewith given data indicating that the client implements a content filter; and (ii) to return a script to the client responsive to a determination that given data is not associated to the request, the script executed in the client, thereby (a) detecting presence of the content filter in the client, (b) responsive to detecting such presence, associating a value to the given data, and (c) re-issuing the request from the client with the given data; and
      second program code responsive to receipt of the re-issued request (i) to receive the resource; (ii) to obfuscate a Uniform Resource Identifier (URI) in the resource according to a policy; and (iii) to serve the resource with the obfuscated URI as a response to the re-issued request, wherein a request associated with the obfuscated URI bypasses the content filter.

2. The apparatus as described in claim 1 wherein the content filter is an ad blocker and the URI is associated with a piece of advertising content.

3. The apparatus as described in claim 1 wherein the first program retrieves the script from a data store.

4. The apparatus as described in claim 3 wherein the second program code retrieves a configuration from the data store, the configuration including the policy identifying the at least one URI.

5. The apparatus as described in claim 1 wherein the computer program instructions further include:
   third program code responsive to receipt of a follow-on request associated with the obfuscated URI to execute a pre-render operation.

6. The apparatus as described in claim 5 wherein the pre-render operation comprises (i) de-obfuscating the obfuscated URI to recover the URI; (ii) fetching a piece of content associated to the URI; (iii) performing a per-rendering operation to generate a constructed response, and (iv) serving the constructed response.

7. The apparatus as described in claim 1 wherein the URI is obfuscated by one of: encryption, and scrambling.

8. The apparatus as described in claim 1 wherein the computer program instructions of the second program code are implemented using a service worker.

9. The apparatus as described in claim 1 wherein the given data is a cookie.

10. A method carried out on a server side of a client-server communication, comprising:
  responsive to receipt of a request for a resource from a client, determining whether the request has associated given data indicating that the client implements a content filter;
  responsive to a determination that the given data is not present in the request to return to the client a script, the script executed in the client, thereby (a) detecting presence of the content filter in the client, (b) responsive to detecting such presence, associating a value to the given data, and (c) re-issuing the request from the client with the given data;
  responsive to receipt of the re-issued request to receive the resource;
  obfuscating a Uniform Resource Identifier (URI) in the resource according to a policy; and
  serving the resource with the at least one obfuscated URI as a response to the re-issued request, wherein a request associated with the obfuscated URI bypasses the content filter.

11. The method as described in claim 10 wherein the content filter is an ad blocker and the URI is associated with a piece of advertising content.

12. The method as described in claim 10 further including receiving a follow-on request associated with the URI and, in response, executing a pre-render operation.

13. The method as described in claim 12 wherein executing the pre-render operation comprises:
  de-obfuscating the obfuscated URI to recover the URI;
  fetching a piece of content associated to the URI;
  performing a per-rendering operation to generate a constructed response, and
  serving the constructed response.

14. The method as described in claim 10 further including instantiating a service worker to perform the obfuscating.

15. The method as described in claim 10 wherein the URI is obfuscated by one of: encryption, and scrambling.

16. A computing system, comprising:
  a client machine comprising a hardware processor, and computer memory; and
  a server machine comprising a hardware processor, and computer memory holding computer program code comprising:
    first program code responsive to receipt of a request for a resource from a client (i) to determine whether the request has associated therewith given data indicating that the client implements a content filter; and (ii) to return a script to the client responsive to a determination that given data is not associated to the request; and
    second program code responsive to receipt of the re-issued request (i) to receive the resource; (ii) to obfuscate a Uniform Resource Identifier (URI) in the resource according to a policy; and (iii) to serve the resource with the obfuscated URI as a response to the re-issued request, wherein a request associated with the obfuscated URI bypasses the content filter;
  the client machine configured to execute the script returned from the server machine, thereby (a) detecting presence of the content filter in the client, (b) associating a value to the given data, (c) generating the re-issued request that includes the given data, and (d) sending the re-issued request to the client machine.

17. The computing system as described in claim 16, wherein the computer program code of the server machine includes third program code responsive to receipt of a follow-on request associated with the obfuscated URI to execute a pre-render operation.

18. The computing system as described in claim 17 wherein the third program code is configured to (i) de-obfuscate the obfuscated URI to recover the URI; (ii) fetch a piece of content associated to the URI; (iii) perform a per-rendering operation to generate a constructed response, and (iv) serve the constructed response.

* * * * *